United States Patent
Roberts et al.

(10) Patent No.: US 10,948,943 B2
(45) Date of Patent: Mar. 16, 2021

(54) CASE FOR A LAPTOP COMPUTER

(71) Applicant: Tech 21 Licensing Limited, Twickenham (GB)

(72) Inventors: Jason Roberts, Twickenham (GB); Wilhelm Marschall, London (GB); Benjamin Thorpe, Uxbridge (GB)

(73) Assignee: TECH 21 LICENSING LIMITED, Middlesex (GB)

( * ) Notice: Subject to any disclaimer, the term of this patent is extended or adjusted under 35 U.S.C. 154(b) by 0 days.

(21) Appl. No.: 15/386,890

(22) Filed: Dec. 21, 2016

(65) Prior Publication Data

US 2017/0220065 A1    Aug. 3, 2017

(30) Foreign Application Priority Data

Dec. 24, 2015    (GB) .................................... 1522862

(51) Int. Cl.
| | |
|---|---|
| *G06F 1/16* | (2006.01) |
| *A45C 11/00* | (2006.01) |
| *B29C 45/16* | (2006.01) |
| *B29L 31/00* | (2006.01) |

(52) U.S. Cl.
CPC ............ *G06F 1/1615* (2013.01); *A45C 11/00* (2013.01); *B29C 45/1676* (2013.01); *G06F 1/1628* (2013.01); *A45C 2011/003* (2013.01); *B29L 2031/7162* (2013.01)

(58) Field of Classification Search
CPC . G06F 1/1615; G06F 1/1628; B29C 45/1676; B29L 2031/7162; A45C 2013/025; A45C 11/00; A45C 2011/003
USPC .......................................................... 206/320
See application file for complete search history.

(56) References Cited

U.S. PATENT DOCUMENTS

| | | | |
|---|---|---|---|
| 5,632,373 A | 5/1997 | Kumar et al. | |
| 5,835,344 A * | 11/1998 | Alexander | G06F 1/1628 361/679.46 |
| 7,280,349 B2 * | 10/2007 | Anderson | G06F 1/181 206/457 |
| 7,643,274 B2 * | 1/2010 | Bekele | G06F 1/1616 206/320 |
| 8,107,228 B2 * | 1/2012 | Sassounian | G06F 1/1654 206/320 |
| 8,139,348 B2 * | 3/2012 | Ruch | G06F 1/1616 206/763 |

(Continued)

OTHER PUBLICATIONS

Office Action dated Oct. 28, 2019 in corresponding Chinese Application No. 201611272943.5.

*Primary Examiner* — J. Gregory Pickett
*Assistant Examiner* — Jenine Pagan
(74) *Attorney, Agent, or Firm* — Stephen J. Weyer, Esq.; Stites & Harbison, PLLC

(57) ABSTRACT

A case for a laptop computer, the case comprising upper and lower shells which are entirely separate from one another. Each shell comprises an outer layer of a first injection moulded polymer and an inner liner of a second injection moulded polymer softer than the first. Each shell defines a cavity having a back surface and upstanding side walls, the cavity being arranged to receive, in use, one half of the laptop computer. The second polymer comprises a plurality of inwardly extending clips which protrude across the cavity from an edge of the side wall furthest from the back surface to, in use, retain the shell on the laptop half.

10 Claims, 2 Drawing Sheets

(56) References Cited

U.S. PATENT DOCUMENTS

| | | | |
|---|---|---|---|
| 8,186,508 B2* | 5/2012 | Fan | A45C 11/00 |
| | | | 206/320 |
| 8,383,216 B1 | 2/2013 | Hynecek | |
| 9,047,061 B2* | 6/2015 | Ahee | G06F 1/1626 |
| 9,118,390 B2* | 8/2015 | Lin | H04B 1/3888 |
| 9,247,795 B2* | 2/2016 | Kim | A45C 11/00 |
| 2007/0227923 A1* | 10/2007 | Kidakarn | A63F 13/02 |
| | | | 206/320 |
| 2008/0308437 A1* | 12/2008 | Lin | G06F 1/1616 |
| | | | 206/320 |
| 2013/0126372 A1* | 5/2013 | Song | G06F 1/1626 |
| | | | 206/320 |
| 2013/0264235 A1* | 10/2013 | Lin | A45C 11/00 |
| | | | 206/320 |
| 2013/0270980 A1 | 10/2013 | Hsu | |
| 2014/0009047 A1* | 1/2014 | Yanagisawa | H05K 5/04 |
| | | | 312/223.1 |
| 2014/0243053 A1* | 8/2014 | Hynecek | A45C 11/00 |
| | | | 455/575.8 |
| 2015/0195938 A1 | 7/2015 | Witter et al. | |
| 2016/0187938 A1* | 6/2016 | Han | G06F 1/1684 |
| | | | 361/679.27 |

* cited by examiner

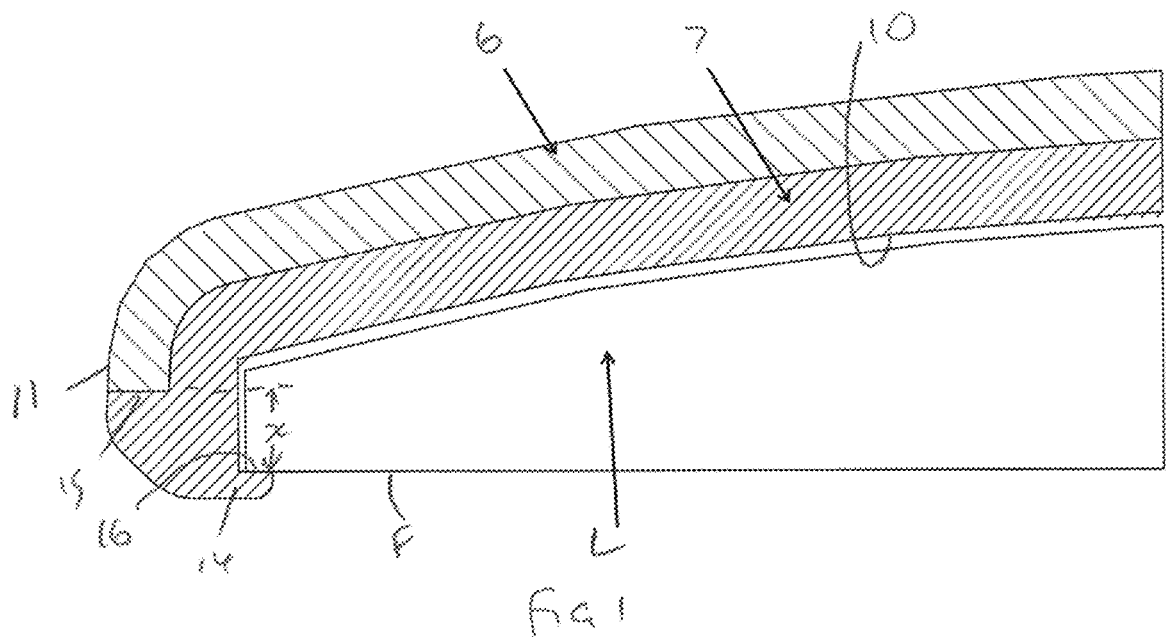
FIG 1
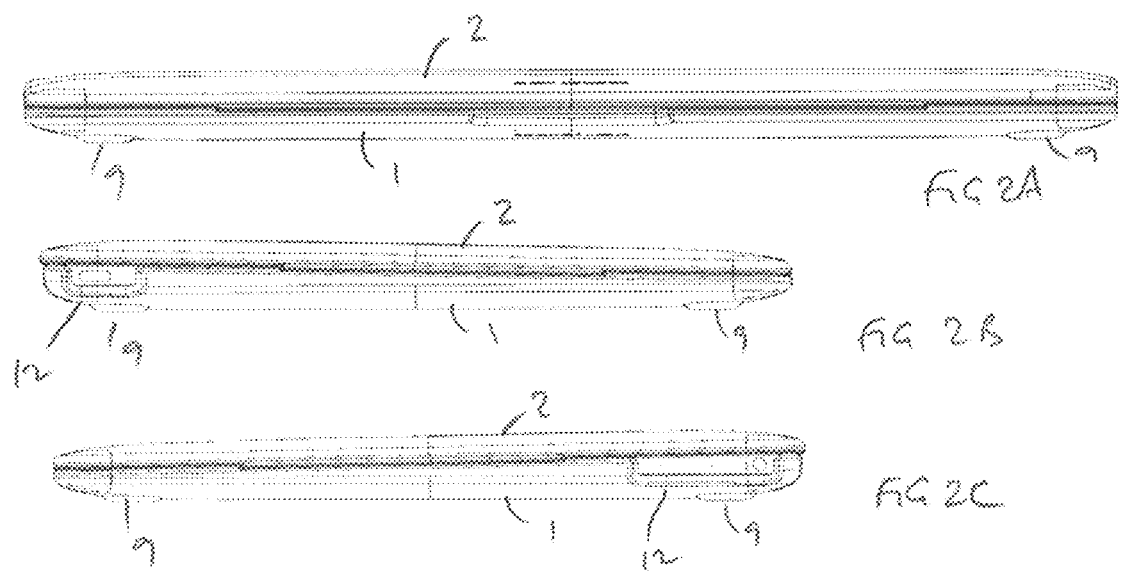
FIG 2A
FIG 2B
FIG 2C

CASE FOR A LAPTOP COMPUTER

FIELD OF THE INVENTION

The present invention relates to a case for a laptop computer.

BACKGROUND OF THE INVENTION

Such cases are known in the art and comprise two separate shells each arranged to clip onto the two halves of the laptop, namely the base and the screen. One such case is the "Impact Snap Case" produced by the applicant. This case is formed of two materials, namely an outer harder layer of polycarbonate with an inner lining of a softer polymer material which extends across a portion of the main face of the case as well as up the sides in order to provide a degree of impact protection. In the event of an impact on the case, the harder material dissipates a significant portion of the impact, while the softer polymer absorbs a further portion.

The Impact Snap Case, in common with all other available laptop cases of this type that we are aware of has a number of clips around the periphery of each shell part which project inwardly in order to grip the edges of the laptop. These are formed in the polycarbonate material as this has the greatest rigidity and is therefore best suited to providing a snap fit over the edge of the laptop half.

SUMMARY OF THE INVENTION

The present invention aims to improve upon the above described case.

According to the present invention there is provided a case for a laptop computer as defined in claim 1.

The present invention takes the apparently counterintuitive step of forming the clips of the softer material. This is counterintuitive because the softer material is not the better of the two materials for providing a snap fit engagement due to its lower rigidity. However, the present invention provides a significant benefit in that, in this vulnerable region, there is no longer direct contact between the harder polymer and the laptop casing. In view of this, the impact protection afforded by the present invention is considerably increased.

The invention bears some superficial resemblance to the case disclosed in U.S. Pat. No. 8,383,216.

This discloses a mobile phone case with a thermo-formed thin film outer layer lined with a flexible elastomeric layer from which an attachment is formed. The problem addressed by this disclosure is that traditional cases have a thicker than necessary outer case. This problem is solved in U.S. Pat. No. 8,383,216 by using a thin thermo-formed layer. This thin thermo-formed outer layer is formed by an in-mould labelling technique in which an already formed outer layer is thermo-formed into its finished shape and is then fixed to the elastomeric inner layer by a number of techniques. The disclosure seems primarily designed for a device such as a smart phone or tablet. Although it mentions a laptop in passing, there is no example of how this is done and no disclosure that the laptop case would have a two-part structure. Further, the inventive step of U.S. Pat. No. 8,383,216 is the use of a thin film outer layer which can only practically be formed using a thermo-forming technique. Such a thin film (which is preferred to be 0.188 to 0.25 mm, but which may also be 0.178 mm to 0.5 mm), could not be successfully applied to a laptop case as this very thin rigid material would offer far worse impact protection than is available from all commercially available laptop cases which have a much thicker polycarbonate layer.

The case of the present invention preferably requires a relatively thick layer of the first polymer in order to optimise the impact dissipation. Preferably, therefore, across the majority of the back surface of the shell where the second material is present, the ratio of the thickness of the first polymer to the second polymer is greater than 0.7 and preferably greater than 1. Thus, the first polymer is almost as thick as or thicker than the second polymer.

Alternatively, the relatively thick second layer may be defined as a second polymer which has a thickness of greater than 0.8 mm across the majority of the back surface where it is present.

Advantageously, the impact protection is concentrated towards the periphery of the case such that there is a region in the centre of each back surface which occupies at least 30% of the area of the back surface in which the second polymer is absent and only the first polymer is present.

Modern laptops such as the latest generation of MacBook have extremely good manufacturing tolerances such that there is little space available for the clips when the laptop is closed. Preferably, therefore, the clips in one shell are offset with respect to those in the other shell such that the clips occupy different parts of the perimeter of the laptop when it is closed. Conversely, the present invention requires the clips to extend around a significant portion of the perimeter of the laptop to allow the softer material of the clips to generate adequate grip. Preferably, therefore, at least 50%, more preferably at least 60% and most preferably at least 70% of the total perimeter of the combined shells is occupied by a clip in one or other of the shells when the two shells are brought together.

The thickness of the clip i.e. the dimension perpendicular to the plane of the back is less than 0.5 mm. This helps the shells to fit onto a laptop where there is a small tolerance between the two halves.

Each clip has an inner face that faces into the cavity, wherein, in a direction perpendicular to a plane containing the back surface, the separation between the inner face of the clip and the closest part of the first polymer is at least 1 mm and preferably greater than 1.5 mm. The effect of this is that the first material terminates well behind the leading edge of the laptop once the laptop is installed behind a clip. This provides enhanced impact protection in the corners as there is a relatively large amount of the softer second polymer. In this region, the harder first polymer is less effective at dissipating the impact across a wider area, given that the edge of the shell is relatively narrow such that a greater proportion of the force would be transmitted through the hard layer should it extend further. By providing only the softer second polymer in this region, the impact absorbing is improved.

Preferably, at least one clip in one shell extends along two adjacent side walls and around a corner, the clip being at least 7 cm long. By providing a long soft clip extending for a considerable distance around the corner of the laptop, the impact protection and gripping in this area is enhanced. Preferably, these clips which extend around the corners are providing in the portion of the shell which is intended to fit on the base of the laptop as a laptop is more likely to be dropped such that the corners of the base hit the ground first. Preferably, the shell intended to fit on the base of the laptop is provided with a foot in each corner, each foot being formed by a recess in the back surface which is formed of the second polymer. At least a portion of the wall of the foot preferably has a smaller thickness than the thickness of the first polymer in other regions of the back surface. Such a design allows feet with a degree of resilience to be readily produced in the shell without having to introduce a third material.

Preferably, the second polymer covering the side wall is preferably provided with a plurality of inwardly extending ribs. These ribs offer yet further enhanced impact absorption.

The present invention also extends to a method of making a case for a laptop computer, the method comprising making upper and lower shells, each shell being formed by injection moulding a first polymer and injection moulding a second polymer softer than the first in order to form a case according to the first aspect of the present invention. The first polymer is preferably moulded first and the second polymer is then moulded onto the first polymer. The second polymer could, however, be moulded first or the two could be co-moulded.

BRIEF DESCRIPTION OF THE DRAWINGS

An example of a case and method in accordance with the present invention will now be described with reference to the accompanying drawings, in which:

FIG. 1 is a cross-section through an edge of the device line 1-1 in FIG. 4;

FIG. 2A is a front view of a laptop with the case installed;

FIG. 2B is a side view of the laptop with the case installed;

FIG. 2C is an opposite side view of the laptop with the case installed;

DETAILED DESCRIPTION

Figure 3:
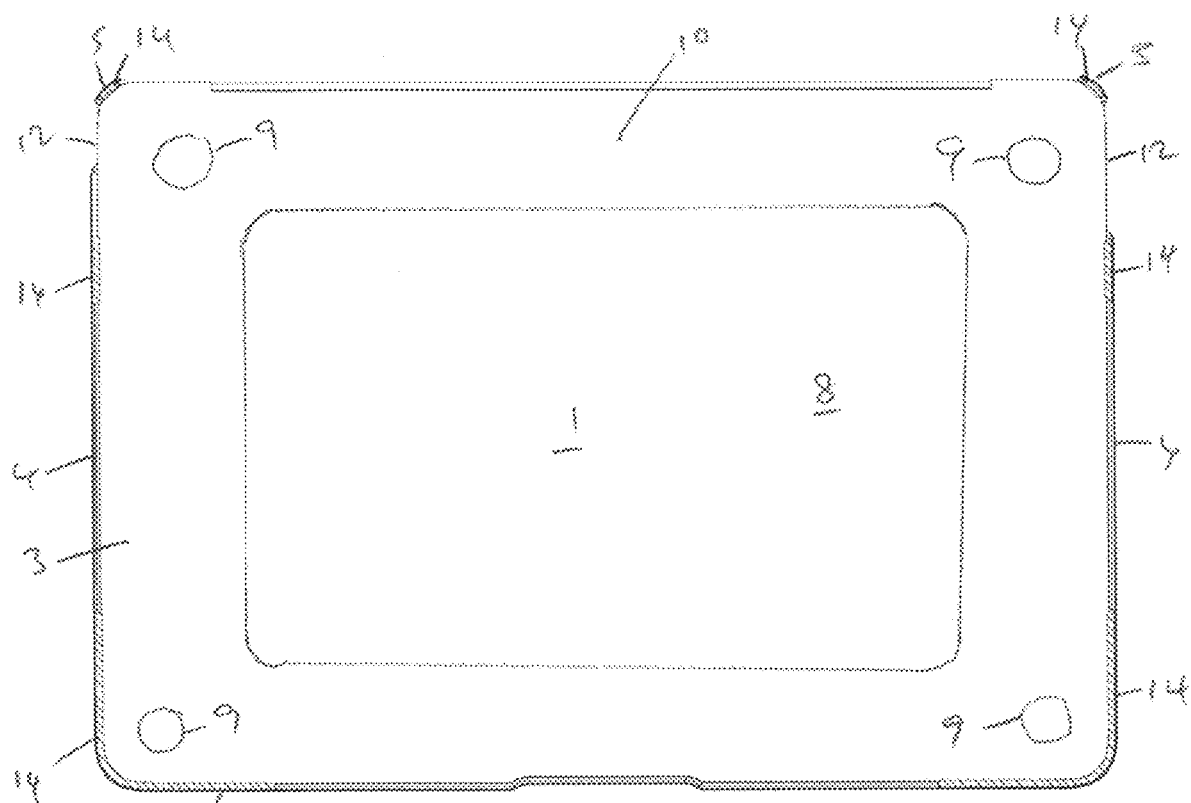
FIG. 3 is a plan view of the lower shell of the case.

The case comprises a lower shell 1 and an upper shell 2 each having a base 3 surrounded by a plurality of upstanding walls 4. In this case, the lower shell 1 does not have a wall extending along its upper edge (as shown in FIG. 3) other than in the corners 5 to allow clearance for the upper case when the laptop L is opened. As well as being absent along the top edge of the lower shell as mentioned above, the lower shell has regions 12 where the side wall 4 is absent to allow access to ports in the side of the laptop. The two shells 1, 2 are each made of two materials, namely a harder outer layer 6. This may be formed of, for example, polycarbonate, polypropylene, acrylic or nylon. This extends generally across the full width and breadth of the shell. The second material is a softer inner layer 7. This may, for example, be TPU or TPE.

This is present across the outer periphery of each shell, but there is a central region 8 in each shell which is devoid of the softer material 7. The softer material may be present here, but as the laptop is less vulnerable to impact damage in this region, it saves weight and cost to omit it here. The lower shell 1 is provided with four feet 9, one adjacent to each corner. These are formed as downwardly depending concave (when viewed from the inside) protrusions made only of the softer material 7 with the harder material 6 being absent in these regions, although again both materials can also be present here.

At the upper edge of the side wall 4 furthest from the base 10, a number of clips 14 are provided. As shown in FIG. 3, the lower shell has two large clips extending around the bottom corners and up a reasonable proportion of each side. These clips may have a total length of at least 7 cm around the perimeter of the shell. There are two further clips 14, one on each side of the side walls and two further clips in the small remaining corners 5.

Figure 4:
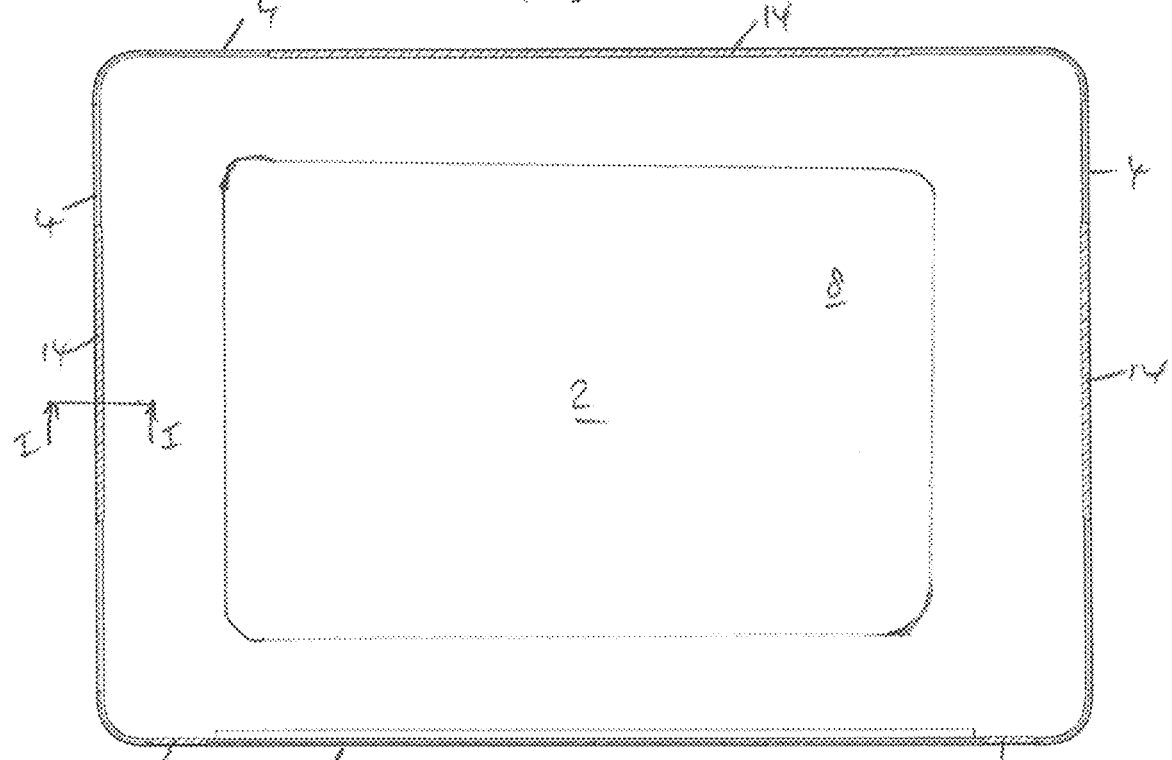
FIG. 4 is a plan view of the upper shell of the case.

The upper shell shown in FIG. 4 has relatively long clips along three of the four sides and a pair of short clips along the bottom side.

It should be noted that the clips on the upper 1 and lower 2 shells are complimentary to one another in the sense that, when the two parts are placed together, there is no overlap between the clips of the two halves. This can be imagined in relation to FIGS. 3 and 4 if the page of the drawings is folded along a line between the two drawings which effectively represents the closing of the laptop with the shells in place. It can be seen, for example, that the long clips in the corners of the lower shell shown in FIG. 3 will overlay a region devoid of clips in the corresponding corners in FIG. 4. Similarly, the long clips down either side of the upper shell in FIG. 4 will fit into a gap between the clips in FIG. 3.

The arrangement of clips 14 may take any number of forms. The important thing is for the clips to be distributed around the periphery of each shell to provide secure clipping and for the clips not to interfere with one another when the laptop is closed.

The structure of the clips is described in greater detail with reference to FIG. 1. Although this is labelled as being through the cross-section I-I in FIG. 4, it will be appreciated that the cross-section will be generally similar at any point around either shell in a location through a clip.

As shown in FIG. 1, the softer material 7 extends along the side 11 further than the harder material 6 such that only the softer material is present in the part of the side wall 11 furthest from the base 10. This softer material then extends back towards the centre of the shell thereby forming the clips 14.

In order to insert the base or screen of the laptop into the shell, it can first be engaged behind one or more of the clips without deforming the clip, but must then be pushed down onto the remaining clip or clips thereby resiliently deforming the material of the clip until the clip snaps into place on the front face F of the laptop L. As can be seen in FIG. 1, there is a separation x between the end face 15 of the harder material and the inwardly facing face 16 of the clip or approximately 1 mm. As will be appreciated from FIG. 1, this ensures that the edge of the laptop is surrounded by a reasonably large proportion of softer material. This provides an enhanced cushioning effect in the vicinity of the laptop edge. If the harder material were to be extended further towards the front face of the laptop F, this would impair the impact absorbing properties.

As can be seen in FIG. 1, the end thickness of the harder material 6 is approximately the same as the thickness of the softer material 7 across the majority of the portion of the shell which extends across the base 10. The total wall thickness in this region is between 1 and 5 mm.

The invention claimed is:
1. A case for a laptop computer, the case comprising:
    an upper shell and a lower shell, the shells being entirely separate from one another, each shell comprising an outer layer of a first injection moulded polymer and an inner liner of a second injection moulded polymer softer than the first, each shell defining a cavity having a back surface and upstanding side walls,
    the respective cavities adapted to receive, in use, one half of the laptop computer,
    the second polymer comprising a plurality of inwardly extending clips which protrude across the cavity from an edge of the side wall furthest from the back surface to, in use, retain the shell on the laptop half, wherein when the laptop is in its closed position, and the upper shell and lower shell receive a respective half of the laptop, and clips from the upper shell do not overlap the clips from the lower shell, all clips in the lower shell are offset with respect to all of the clips in the upper shell and wherein at least 50% of a total perimeter of the upper shell and the lower shell is occupied by the clips of either the upper shell or the lower shell.

2. A case according to claim 1, wherein across the majority of the back surface of the shell where the second polymer is present, the ratio of the thickness of the first polymer to the second polymer is greater than 0.7 mm.

3. A case according to claim 1, wherein there is a region in the centre of each back surface which occupies at least 30% of the area of the back surface in which the second polymer is absent and only the first polymer is present.

4. A case according to claim 1, wherein at least 60% of the total perimeter of the combined shells is occupied by a clip in one or other of the shells when the two shells are brought together.

5. A case according to claim 1, wherein each clip has an inner face that faces into the cavity, wherein, in a direction perpendicular to a plane containing the back surface, the separation between the inner face of the clip and the closest part of the first polymer is at least 0.5 mm.

6. A case according to claim 1, wherein at least one clip in one shell extends along two adjacent side walls and around a corner, the clip being at least 7 cm long.

7. A case according to claim 6, wherein the clips which extend around the corners are located in the portion of the shell which is intended to fit on the base of the laptop.

8. A case according to claim 1, wherein the shell intended to fit on the base of the laptop is provided with a foot in each corner, each foot being formed by a recess in the back surface which is formed of the second polymer.

9. A case according to claim 1, wherein the second polymer covering the side wall is preferably provided with a plurality of inwardly extending ribs.

10. A method of making a case for a laptop computer, the method comprising making upper and lower shells, each shell being formed by injection moulding a first polymer and injection moulding a second polymer softer than the first in order to form the case comprising the upper and lower shell which are entirely separate from one another, each shell defining a cavity having a back surface and upstanding side walls, the respective cavities adapted to receive, in use, one half of the laptop computer, the second polymer comprising a plurality of inwardly extending clips which protrude across the cavity from an edge of the side wall furthest from the back surface to, in use, retain the shell on the laptop half, wherein when the laptop is in its closed position, and the upper shell and lower shell receive a respective half of the laptop, and clips from the upper shell do not overlap the clips from the lower shell, and all clips in the lower shell are offset with respect to all of clips in the upper shell and wherein at least 50% of a total perimeter of the upper shell and the lower shell is occupied by the clips of either the upper shell or the lower shell.

\* \* \* \* \*